(12) United States Patent
Boutaghou et al.

(10) Patent No.: US 6,195,235 B1
(45) Date of Patent: Feb. 27, 2001

(54) SLIDER WITH DEPOSITED ROUGHENED SURFACE STRUCTURE

(75) Inventors: Zine-Eddine Boutaghou, Vadnais Heights; Aric Kumaran Menon, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/130,415

(22) Filed: Aug. 6, 1998

Related U.S. Application Data
(60) Provisional application No. 60/067,689, filed on Dec. 4, 1997.

(51) Int. Cl.[7] .................................................... G11B 5/60
(52) U.S. Cl. ...................................... 360/235.2; 360/236.6
(58) Field of Search ..................... 360/103, 235.1–235.3, 360/235.8, 236.6

(56) References Cited

U.S. PATENT DOCUMENTS

| | | | |
|---|---|---|---|
| 4,709,284 | * 11/1987 | Endo | 360/103 |
| 5,162,073 | 11/1992 | Aronoff et al. | 156/625 |
| 5,609,657 | 3/1997 | Ishitobi | 51/309 |
| 5,822,153 | * 10/1998 | Lairson | 360/103 |
| 5,862,013 | * 1/1999 | Haga | 360/103 |

* cited by examiner

Primary Examiner—A. J. Heinz
(74) Attorney, Agent, or Firm—Westman, Champlin & Kelly, P.A.

(57) ABSTRACT

A slider for supporting transducer elements in a data storage system including a granular particle composition including multiple layers of particles for providing a contact interface between the slider and disc surface. The multiple particle layers provide an uneven surface structure for stiction control. The multiple particle layers provide for wear while maintaining an uneven surface structure for stiction control.

20 Claims, 7 Drawing Sheets

SLIDER WITH DEPOSITED ROUGHENED SURFACE STRUCTURE

CROSS-REFERENCE TO RELATED APPLICATION

The present application claims priority to U.S. Provisional Application Serial No. 60/067,689, entitled "CONTACT ON SUPER-SMOOTH SURFACES: A SOLUTION TO STICK-SLIP AND HIGH FRICTION DUE TO CONTACT WITH SMOOTH MEDIA," filed Dec. 4, 1997.

BACKGROUND OF THE INVENTION

The present invention relates to data storage systems. In particular, the present invention relates to a slider design for supporting transducers for reading and writing information to a data storage system.

Data storage systems are known which include transducers supported relative to a disc surface for reading and writing information. Known transducer elements include inductive-type transducers and magnetoresistive transducer elements. The transducers are supported via a slider having a bearing surface for supporting the transducers above the disc surface for proximity recording. As the disc spins, air flows under the bearing surface to raise the slider (and transducer elements) relative to the disc surface to fly over the disc surface for read and write operations.

During operation of the disc drive, the slider intermittently contacts the disc media. Contact between the slider and disc surface may cause the slider to stick degrading operation of the disc drive. Prior disc surfaces are textured to reduce stiction between the slider and disc surface when the slider contacts the disc surface during operation. Alternate disc surfaces are relatively smooth, which is particularly advantageous for magnetoresistive heads ("MR") due to thermal asperities, but do not provide a desired surface structure for stiction control.

Bearing surfaces may be textured by known surface texturing techniques such as by a chemical etching process or may be treated by a laser or ion milling technique to reduce stiction. Textured surfaces formed by altering the surface structure of the slider may wear via continuous contact between the slider bearing surface and the disc surface thus degrading the effectiveness of the textured surface to limit stiction. Wear of a textured slider surface in a disc drive having a smooth disc media surface is particularly significant since the surface structure of the disc does not provide desired stiction control.

SUMMARY OF THE INVENTION

The present invention relates to a slider for supporting transducer elements in a data storage system including a granular particle composition including multiple layers of particles for providing a contact interface between the slider and disc surface to reduce stiction during intermittent contact. The multiple particle layers provides an uneven surface structure for stiction control. The multiple particle layers provide for wear while maintaining an uneven surface structure for stiction control.

It should be understood that the drawings are for illustration and are not drawn to scale. Details of the drawings have been exaggerated for clarity.

DETAILED DESCRIPTION OF THE PREFERRED EMBODIMENTS

Figure 1:
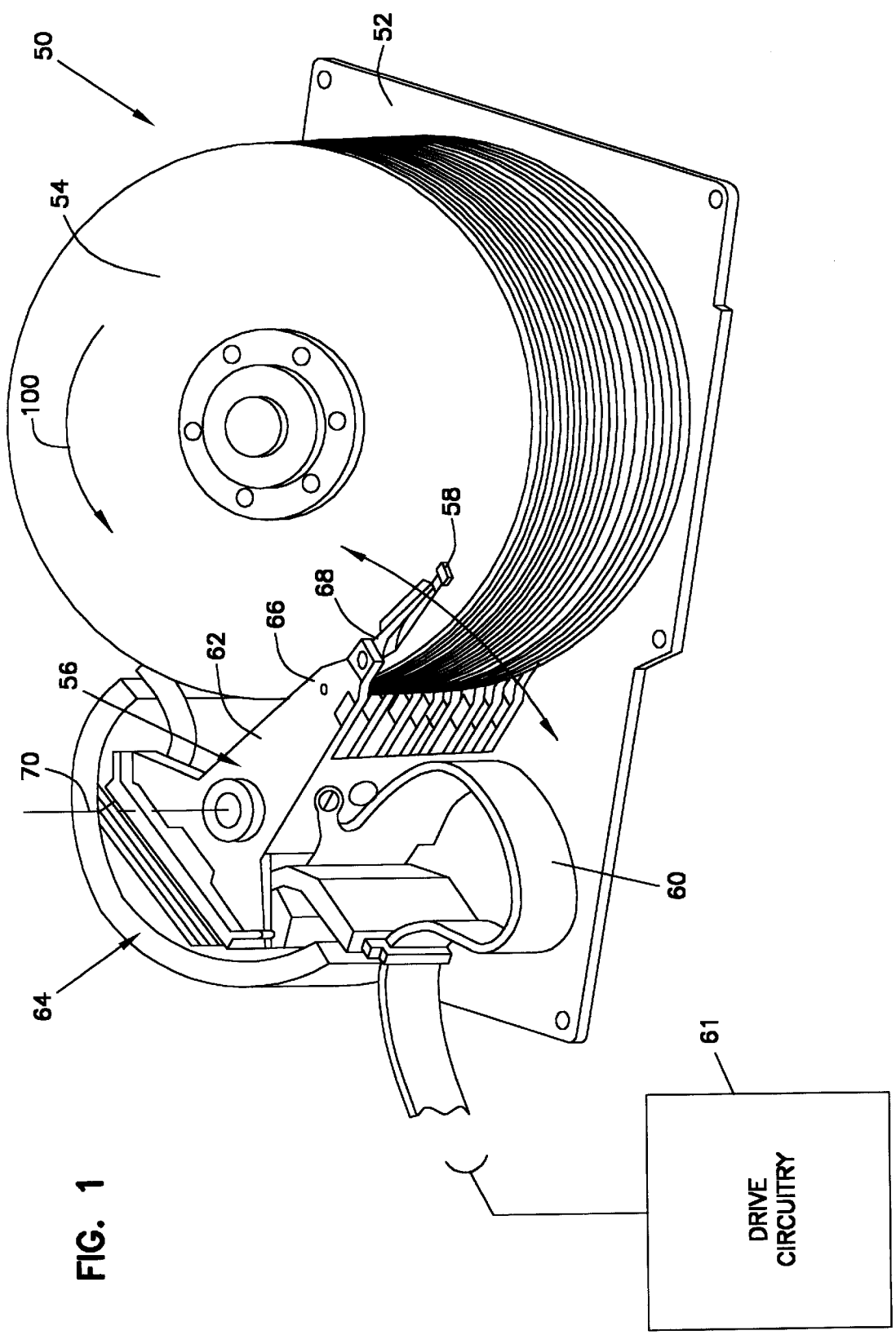
FIG. 1 is a perspective view of an embodiment of a disc drive.

The present invention relates to a data storage system and, in particular, has applications to a disc drive 50 for storing digital information as shown in FIG. 1. As shown, an embodiment of disc drive 50 includes a base 52, a disc stack 54, and rotary actuator 56, which supports heads 58 relative to surfaces of discs of disc stack 54 to read and write information to and from discs. Heads 58 are coupled to a flex circuit 60, which is coupled to circuitry 61 of the disc drive for read and write operations.

Figure 2:
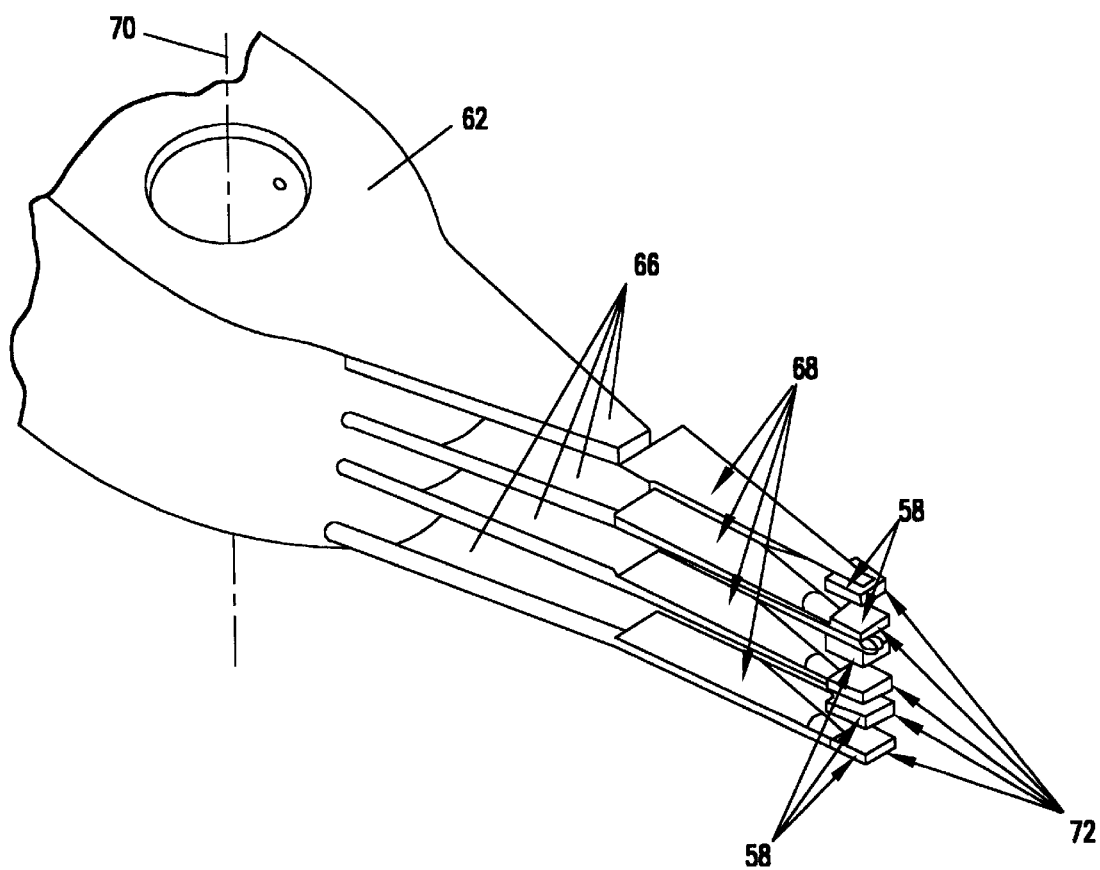
FIG. 2 is a perspective view of an embodiment of an actuator block for supporting heads of a disc drive.

In particular, the rotary actuator 56 includes an actuator block 62 and a voice coil motor 64 for movement. Heads 58 are supported relative to the actuator block 62 via a plurality of stacked actuator arms 66. The heads 58 are coupled to the actuator arms 66 via suspension assemblies 68 in a known manner. Operation of the disc drive rotates the actuator block 62 about an axis 70 for positioning heads 58 relative to selected data tracks on the disc surface via operation of the voice coil motor 64. FIG. 2 is a detailed perspective view of the actuator block 62, which illustrates heads 58 supported via suspension assemblies 68 coupled to actuator arms 66. As shown, heads 58 include a slider 72, which supports transducer elements for read and write operations.

Figure 3:
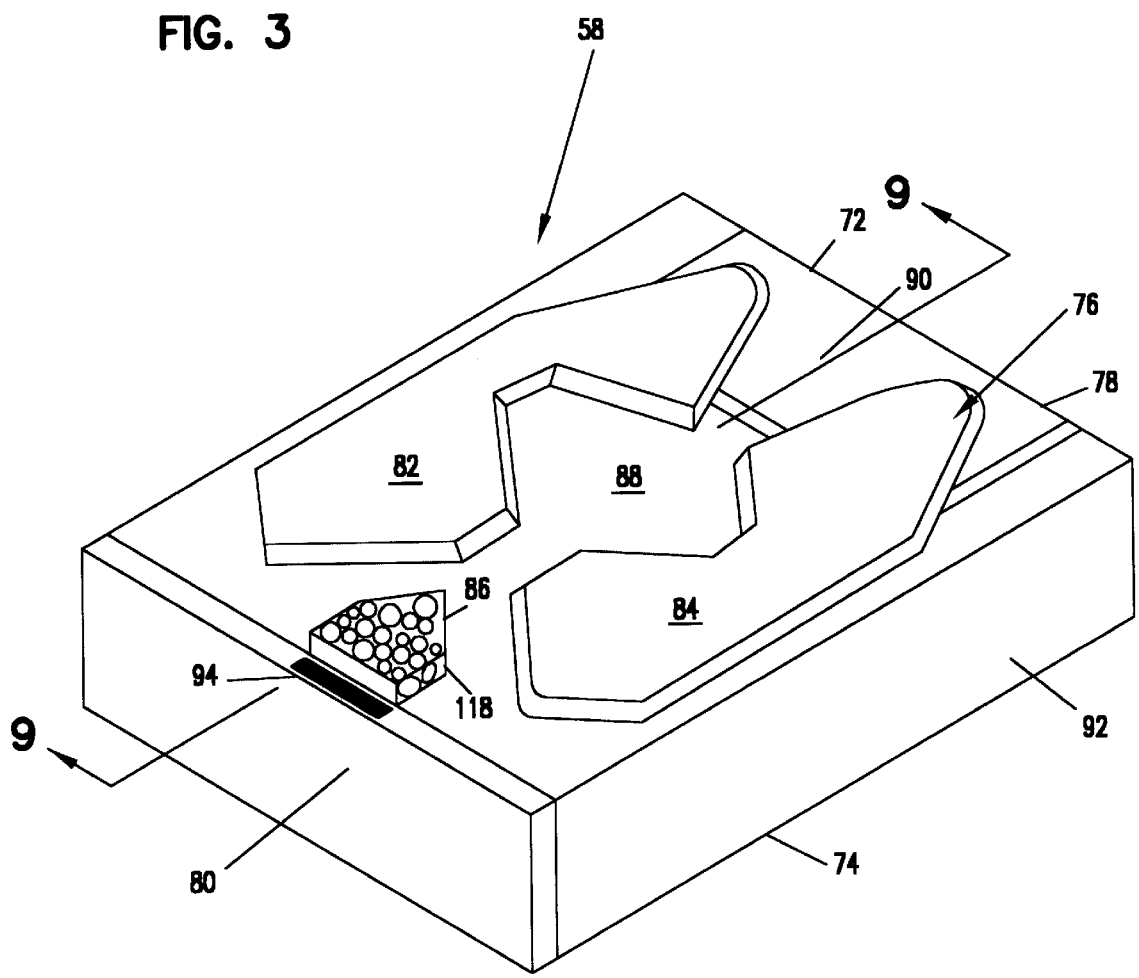
FIG. 3 is a perspective view of an embodiment of a head including a slider and transducer elements illustrated diagrammatically.

FIG. 3 illustrates an embodiment of a slider 72 including an upper face 74, lower face 76, a leading edge 78, and a trailing edge 80. As shown, lower face 76 includes raised side rails 82, 84, and center rail 86 forming bearing surfaces or a bearing for operation of the slider above the disc surface. Raised side rails 82, 84 and center rail 86 are elevated above a recessed bearing cavity or base 88. The bearing also includes a stepped surface 90 at a leading edge 78 for providing lift for the slider 72 for pressurization during "take off". The slider is formed of a substrate 92 such as a ceramic material, such as a mixture of TiC (Titanium Carbide) and Alumina ($Al_2O_3$), or other known slider materials. The bearing surfaces (side rails 82, 84; center rail 86; and surface 90) are formed by known subtractive masking techniques such as milling or chemical etching.

Transducers 94 (illustrated diagrammatically) are supported proximate to the trailing edge 80 of the slider to form head 58. Transducers may be inductivetype transducers or magnetoresistive-type ("MR") transducers. Transducers are embedded in an Alumina layer which is deposited on the trailing edge 80 of the slider via known deposit techniques.

Slider 72 is coupled to suspension assembly 68 at upper face 74 of the slider so that bearing surfaces face the disc surface. As the disc rotates, the disc pulls a very thin layer of air or fluid beneath the bearing surfaces, which develops a lifting force that causes the slider 72 to lift and fly several microinches above the disc surface. In particular, skin friction on the air bearing surfaces causes air pressure to develop between the disc and the air bearing surfaces to provide lift to the slider to raise the slider to fly above the disc surface for proximity recording. The disc rotates as illustrated by arrow 100 of FIG. 1 to cause air to flow from leading edge 78 to trailing edge 80 for flying operations of heads 58.

During operation, the slider intermittently contacts the disc surface. Contact between the slider and disc surface may cause the slider to stick to the disc surface due to stiction at the slider—disc media interface. Disc surfaces for inductive type transducers may be textured to reduce stiction. However, a polished surface media, which is particularly advantageous for an MR head to reduce thermal asperities, degrades stiction control.

Figure 4:
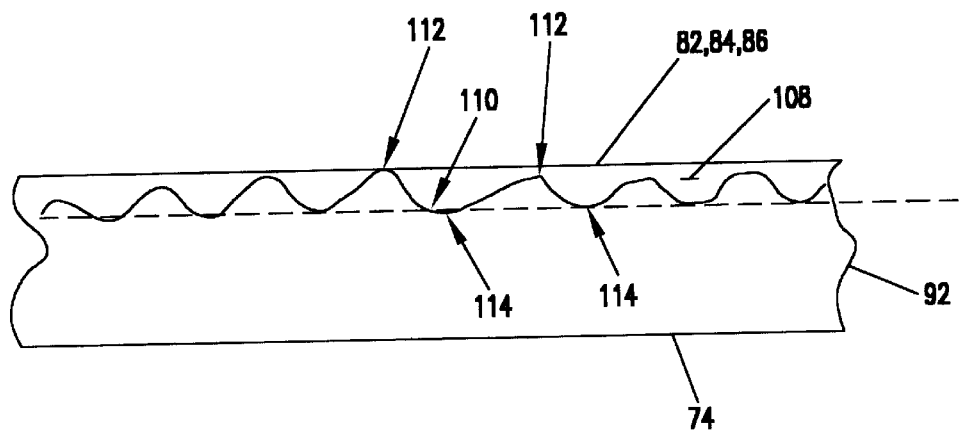
FIG. 4 is an illustrative view of a textured substrate surface of the prior art.

To limit stiction, bearing surfaces 82, 84 or 86 (or other slider contact surfaces) may be textured as illustrated in FIG. 4 by selectively removing material 108 by known mechanical texturing techniques such as milling, etching, etc., from the bearing surface (i.e., substrate surface) to form an uneven surface structure 110. The uneven surface structure 110 defines elevated portions 112 extending above valleys 114 for stiction control.

Figure 5:
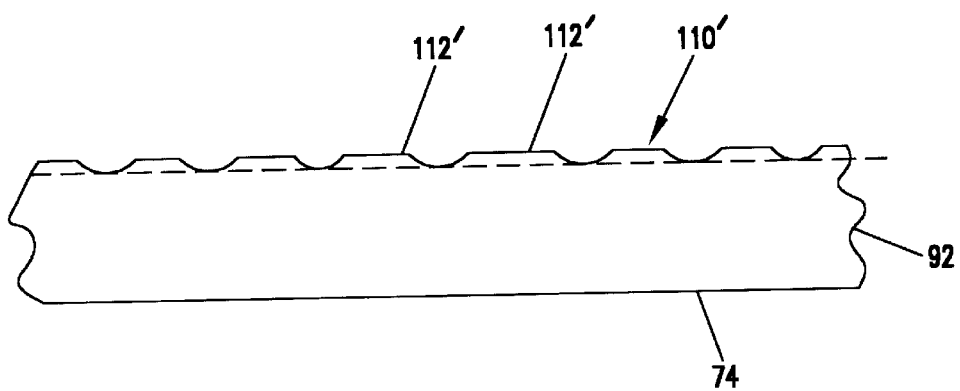
FIG. 5 is an illustrative view of the surface of FIG. 4 after wear.

As shown in FIG. 5, since only the exposed surface structure is roughened, repeat contact of the slider with the disc surface wears the uneven surface structure 110 so that the elevated portions erode 112' creating a relatively flat slider contact surface 110' which increases stiction. In the embodiment of slider 72 of the present invention an uneven surface structure for stiction control is formed of a granular composition 118 as shown in FIG. 6 which is formed on substrate surface as will be explained for a reduced stiction contact interface.

Figure 6:
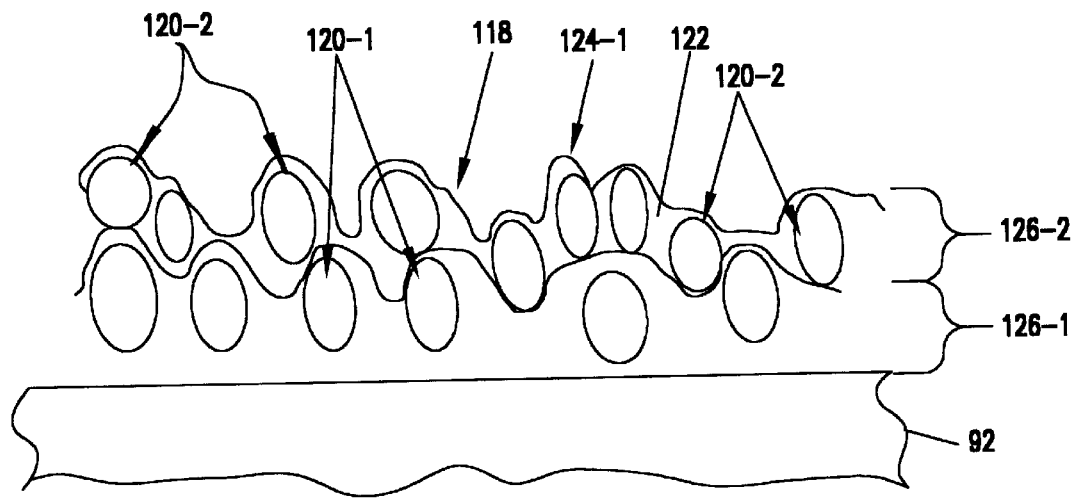
FIG. 6 is an illustrative view of an embodiment of a granular composition deposited on a slider substrate surface for wear resistance.
Figure 7:
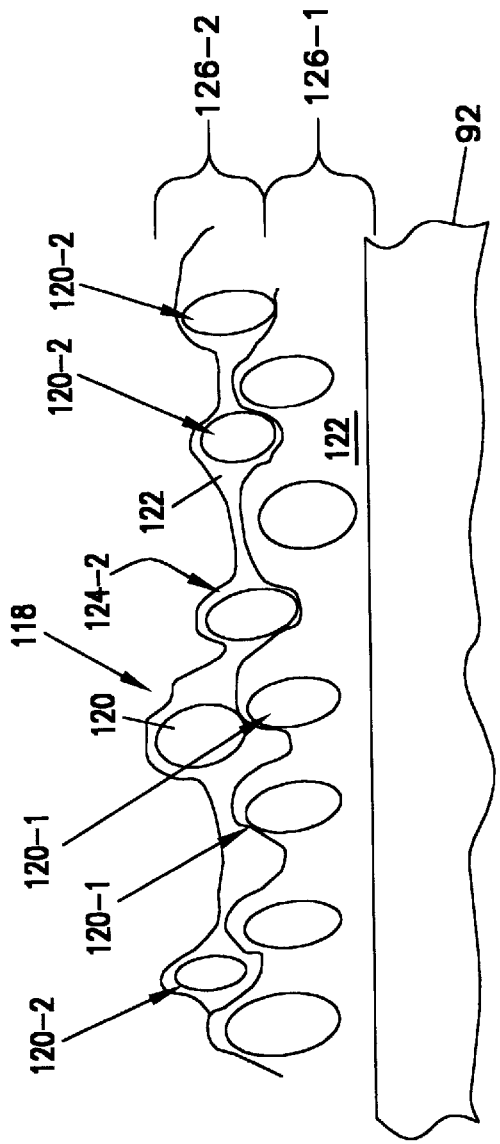
FIG. 7 is a view of the composition of FIG. 6 illustrating wear of an exposed upper layer of particles.

As shown in FIGS. 6–7, the granular particle composition 118 includes microscopic particles 120 deposited to the substrate surface 92 of the slider. Preferably, particles 120 are supported by a base 122. The microscopic particles 120 provide a roughened surface structure 124-1 having ridges and valleys. Multiple layers 126-1 and 126-2 of particles 120 are deposited to the substrate surface. Thus, wear of upper particles of a multilayer particle structure exposes additional buried particles for providing a continuous roughened surface structure for stiction control which is not degraded by wear. Multiple particle layers 126-1 and 126-2 are deposited so that aligned particles of particle layers 126-1 and 126-2 alternatively form the ridges and valleys of the roughened surface structure. Wear of upper particles 120-2 shown in FIG. 7 exposes particle 120-1 for a continued uneven surface structure.

Figure 8:
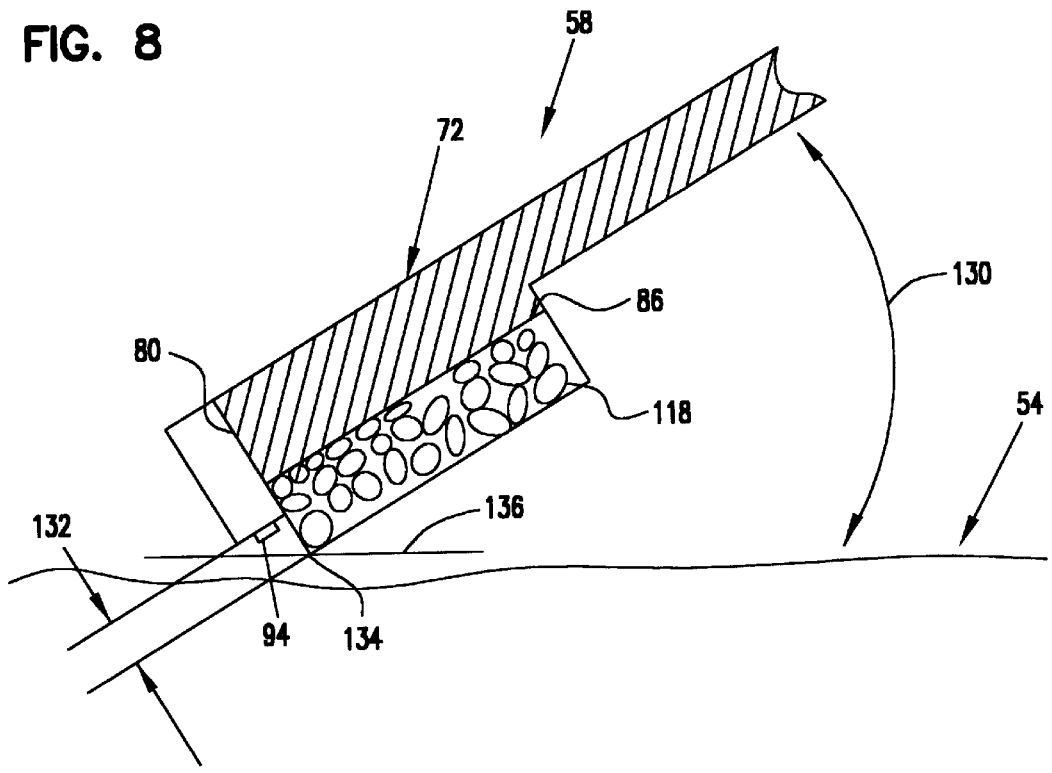
FIG. 8 is an illustrative view of a portion of an embodiment of a head of the present invention flying at a pitch angle relative to the disc surface.

During operation a slider is supported at a pitch angle 130 as illustrated in FIG. 8 such that the trailing edge 80 of the slider 72 is positioned closer to the disc surface than the leading edge (not shown). In an embodiment of the slider shown, granular particle composition 118 is deposited on the slider substrate proximate to trailing edge 80 at center rail 86 to provide a contact interface between slider and the disc surface. The composition 118 extends a distance 132 beyond the transducer elements 94 so that the composition 118 provides the close point for contact between the slider and the disc surface. Distance 132 varies based upon slider-disc interface parameters so that the composition 118 defines the close point 134 (lowest elevation to the disc surface as illustrated by line 136) between the head 58 and disc surface 54.

Figure 9:
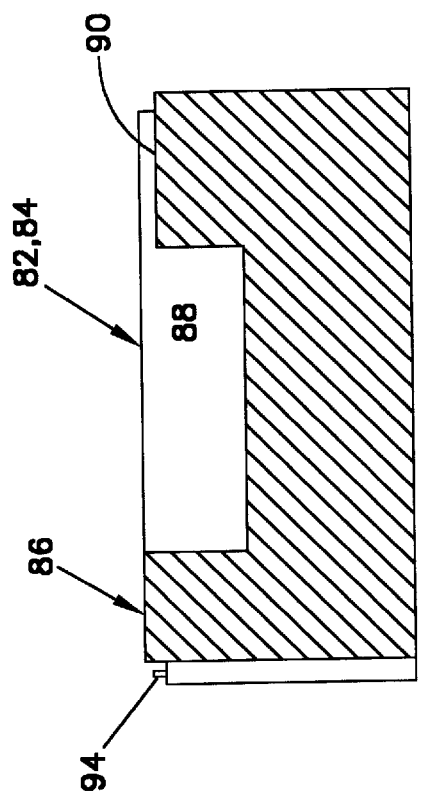
FIG. 9 is a cross-sectional view of a head taken generally along line 9—9 of FIG. 3 illustrating raised bearing surfaces.
Figure 10:
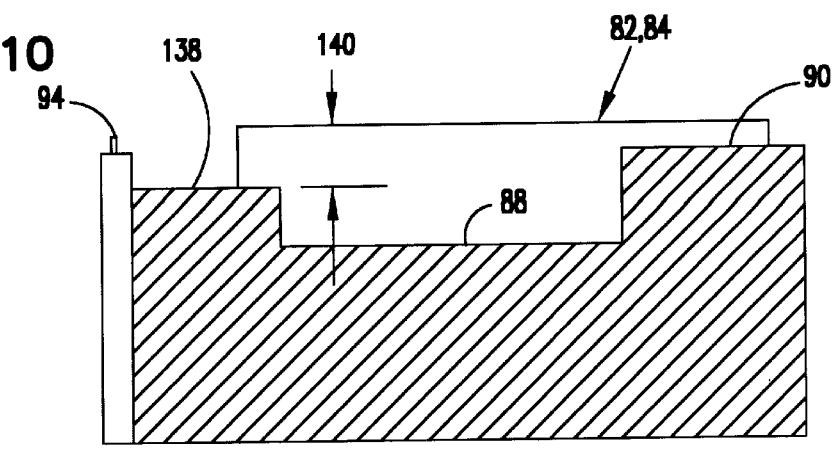
FIG. 10 is a cross-sectional view similar to FIG. 9 illustrating cavity formed at a raised bearing surface.
Figure 11:
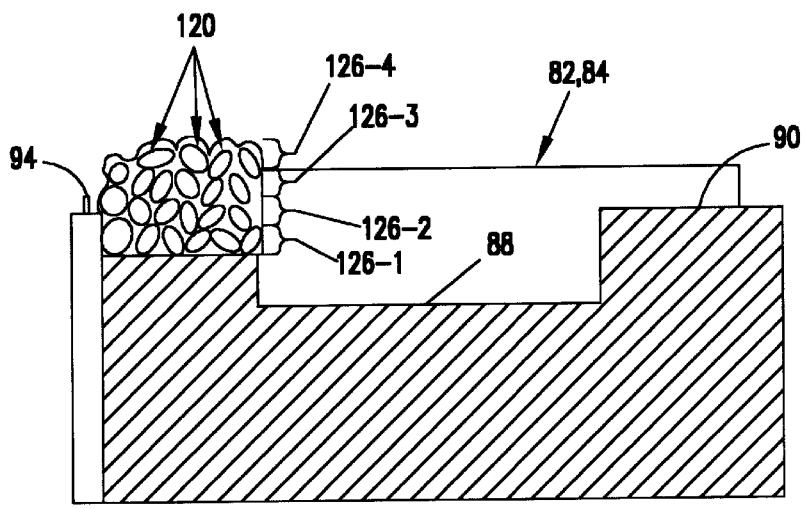
FIG. 11 is a cross-sectional view similar to FIG. 10 illustrating granular composition deposited in the cavity.
Figure 12:
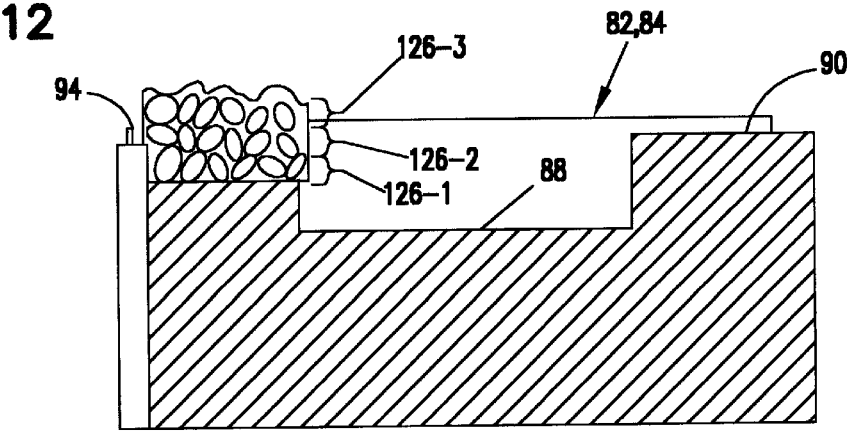
FIG. 12 is a cross-sectional view similar to FIG. 11 illustrating wear of exposed particles of the granular composition.

FIGS. 9–12 illustrate formation of the granular particle composition 118 at the contact interface proximate to center rail 86. FIG. 9 is a side view of slider illustrating bearing surfaces and cavity 88 formed by known substrative processes. As shown in FIG. 9, transducer elements 94 are recessed from the bearing surfaces. As shown in FIG. 10, during the slider fabrication process, a deposit cavity 138 is etched into center rail 86 as comparatively illustrated in FIGS. 9–10. Thus, rails of the bearing are formed by a first etching process, and cavity 138 is formed at a subsequent etching process. The granular particle composition 118 is deposited in cavity 138 as shown in FIGS. 12–13. Preferably, the depth of cavity 138 extends below transducer layer to a depth 140 from the bearing surfaces. The thickness of the granular particle composition 118 deposited in cavity 138 extends above the recessed transducer elements 94 as illustrated in FIG. 11 for desired contact interface with the disc surface based upon the pitch angle 130 of the slider.

Preferably, the granular particle composition 118 is formed of silica particles preferably having an mean or average particle dimension of 0.8 microinches. The silica particles may be formed of a gel sol process and deposited to the slider substrate. Alternatively silica particles may be sputtered onto the substrate surface. Base 122 may be sputtered onto the silica particles to support the particles on the substrate surface 92. Preferably the base 122 is a diamond-like carbon or other adhesive material which supports the particles 120 on the substrate surface. As shown, multiple layers 126-1, 126-2, 126-3 and 126-4 of particles 120 are deposited to provide multiple particle layers to compensate for wear without degrading stiction control. As particles wear, lower particle layers are exposed as comparatively illustrated by FIGS. 11 and 12 to provide a continuous roughened surface structure to limit stiction.

As described, the composition deposited includes multiple layers of particles so that a rough surface structure is maintained if a first layer of particles wears due to contact with the disc surface. Although the composition 118 is shown deposited at center rail 86, the location of granular particle composition 118 is not limited to the exact embodiment shown and may be varied to provide a contact interface to reduce stiction between the slider and the disc surface. Preferably, the cavity depth 140 is approximately 0.5 to 1.5 microinches depending upon the particle 120 size and the number of layers of particles used and the elevation of the granular particle composition and pitch angle of the slider. Preferably, at least two particle layers are used. As an example, cavity depth 140 may be 1.6 $\mu$inches for a dual layer composition having an average particle size of 0.8 $\mu$inches.

Although the present invention has been described with reference to preferred embodiments, workers skilled in the art will recognize that changes may be made in form and detail without departing from the spirit and scope of the invention. In particular, although the present invention is illustrated with a disc drive with magnetically encoded data, the invention is not limited to magnetically encoded data storage devices and may be extended to optical data storage systems, for example.

What is claimed is:

1. A slider adapted to support transducer elements in a data storage system, comprising:
   a substrate including an upper face and a lower face including a raised bearing surface adapted for hydrodynamic operation of the slider above a disc surface; and
   a granular particle composition including granular particles supported in a base material deposited on the lower face of the substrate to form a roughened surface structure.

2. The slider of claim 1 wherein the particle composition includes silica particles.

3. The slider of claim 1 wherein the granular particle composition includes multiple layers of particles deposited on the substrate.

4. The slider of claim 1 wherein the base material is sputtered on a deposited layer of granular particles.

5. The slider of claim 1 wherein the base material comprises a diamond like carbon.

6. The slider of claim 1 wherein the particle composition is deposited at a contact interface between the slider and the disc surface proximate to a trailing edge of the slider.

7. The slider of claim 1 wherein the particle composition is deposited into a cavity formed in the raised bearing surface.

8. The slider of claim 7 wherein a thickness of the composition deposited is greater than or equal to a depth of the cavity so that a portion of the particle composition is elevated above the bearing surface.

9. The slider of claim 1 wherein the particle composition includes granular particles approximately 0.8 microinches in dimension.

10. The slider of claim 1 wherein the granular particles are deposited by a gel sol process.

11. The slider of claim 1 wherein the granular particles are sputtered onto the substrate surface.

12. A method for forming a slider comprising the steps of:
    forming a raised bearing surface on a face surface of a slider substrate;
    forming a cavity on the raised bearing surface; and
    depositing a granular particle composition in the formed cavity.

13. The method of claim 12 wherein depositing the granular particle composition further comprises the step of:
    depositing multiple layers of granular particles supported by a base material onto the slider substrate.

14. The method of claim 12 wherein the step of depositing the granular particle composition comprises the steps of:
    sputtering granular particles on the slider substrate; and
    sputtering a base material over the granular particles.

15. The method of claim 12 further comprising the step of:
    using a gel sol process to form the granular particle composition.

16. A slider adapted to support a transducer element in a data storage system comprising:
    a substrate including opposed first and second faces, the second face including a raised bearing surface adapted for hydrodynamic operation of the slider above a disc surface; and
    deposited abrasive means on the second face of the substrate to form a roughened surface structure for stiction control.

17. The slider of claim 16 wherein the deposited abrasive means includes granular particles dispersed in a base material.

18. The slider of claim 17 wherein the base material is a diamond-like carbon.

19. The slider of claim 16 wherein the deposited abrasive means includes granular particles having a mean or average dimension of approximately 0.8 $\mu$inches.

20. The slider of claim 16 wherein the deposited abrasive means includes multiple layers of granular particles on the second face.

* * * * *